Jan. 23, 1973     H. BUMM ET AL     3,712,809
METHOD OF MAKING CERMETS OF HIGH STATIC
AND DYNAMICAL STRENGTH
Filed March 20, 1969     4 Sheets-Sheet 1

UO$_2$/12 vol% Mo
(ABOUT 99%
THEORETICAL
DENSITY)

170 μ

UO$_2$/40 vol% Mo
(ABOUT 100%
THEORETICAL
DENSITY)

70 μ

UO$_2$/30 vol% Mo
(ABOUT 85%
THEORETICAL
DENSITY)

50 μ

Inventors:
Hellmut Bumm
Fritz Thümmler
Peter Weimar
By: Spencer & Kaye
Attorneys △—△ UO$_2$/30 vol % Mo
×—× UO$_2$/20 vol % Mo
●—● UO$_2$/12 vol % Mo
□—□ UO$_2$/ 6 vol % Mo
○—○ UO$_2$/ 3 vol % Mo Inventors:
Hellmut Bumm
Fritz Thümmler
Peter Weimar
By: Spencer & Kaye
Attorneys

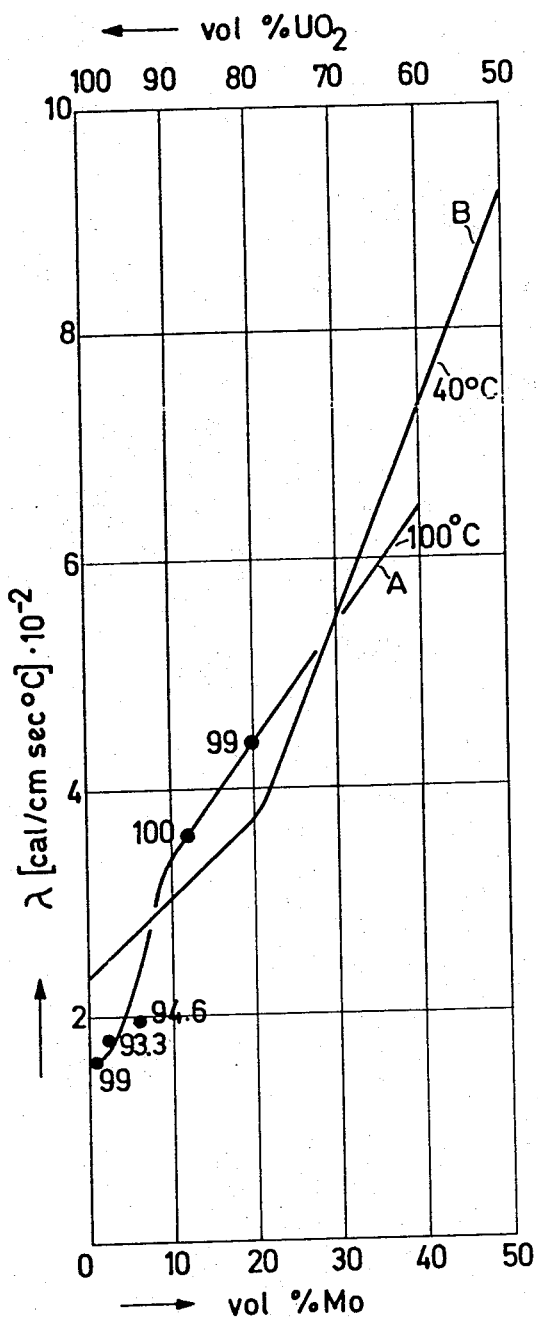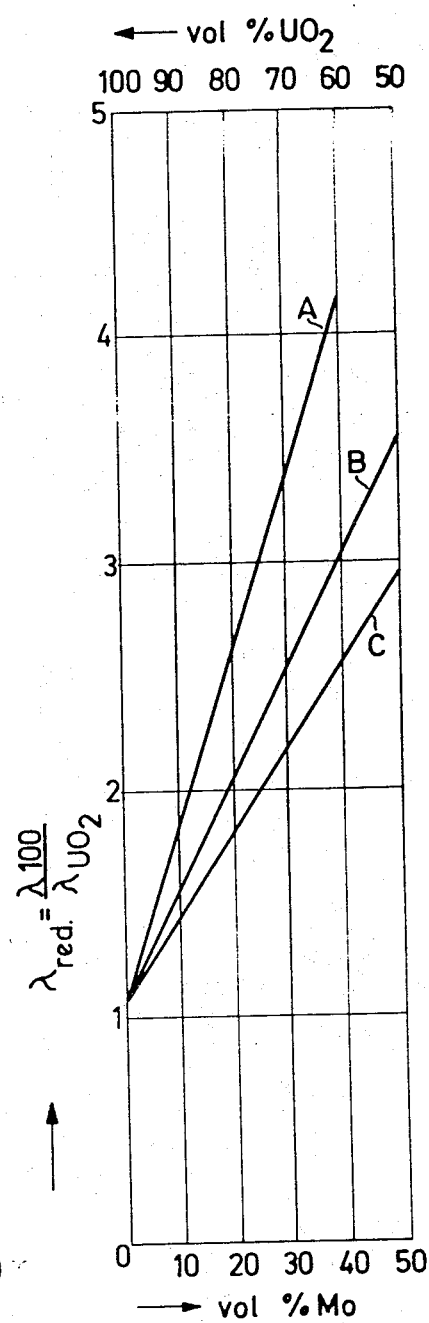

ively as against familar cermets.
United States Patent Office
3,712,809
Patented Jan. 23, 1973

3,712,809
METHOD OF MAKING CERMETS OF HIGH STATIC AND DYNAMICAL STRENGTH
Hellmut Bumm, Karlsruhe, Fritz Thümmler, Grunwettersbach, and Peter Weimar, Karlsruhe, Germany, assignors to Gesellschaft fur Kernforschung mbH, Karlsruhe, Germany
Filed Mar. 20, 1969, Ser. No. 808,955
Claims priority, application Germany, Mar. 23, 1968, P 17 71 026.8
Int. Cl. B22f 1/60
U.S. Cl. 75—206         12 Claims

ABSTRACT OF THE DISCLOSURE

A method of fabricating cermets of high static and dynamic strength, including the steps of vibrating metal-coated ceramic particles having a particle size range between 20 and 500 μm. in metallic capsules, welding the capsules airtight, and compacting the particles to ultimate density by isostatic pressing at pressures between 100 and 1000 kg./cm.$^2$ and temperatures between 1000 and 1700° C., the capsules having still sufficient plasticity under the conditions of the compacting.

---

Figure 1:
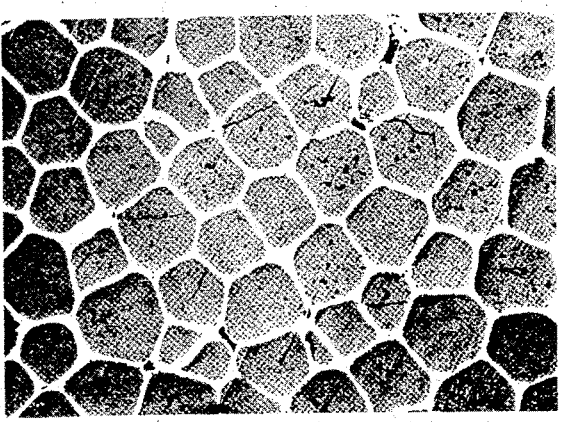

The invention relates to a method of fabricating cermets of high static and dynamic strength.

Cermets are characterized, above all, by their high resistance to oxidation and their good stability at high temperatures. The introduction of the metallic phase also greatly improves thermal conductivity and electric conductivity relative to pure ceramics. Hence, cermets have found wide application in many fields of technology. In conventional mechanical engineering, they are used as construction materials, in high temperature technology they are employed, for instance, as materials for crucibles, or in nuclear technology as fuel materials. However, the cermets known up to now frequently have retained the disadvantage of insufficient mechanical strength.

The present invention therefore is based on the problem of finding cermets with high static and dynamic strength and a method of their fabrication. Such cermets are characterized by a metal content extending uniformly in all three dimensions and ranging from 10 to 50 vol. percent, preferably from 20 to 40 vol. percent, with the density of the metal component in the cermet being in the range between 95 and 100%, preferably between 99 and 100%, of the theoretical density and that of the ceramic component being in the range between 85 and 100% of the theoretical density. Another characteristic of the cermets of the invention is the fact that the ceramic particles are imbedded in the metallic phase so that each individual particle is separated from the adjacent one by an intermediate metallic layer. Special advantages are offered by cermets of nearly spherical ceramic particles, because in this way also the metal matrix receives spherical surfaces and thus becomes very stable against mechanical stresses, even with low metal content. It is the very imbedding of the originally very brittle ceramic particles in a continuous three-dimensional closed metal network, which is nearly free of pores at that high density, i.e., free of notches in the sense of the theory of strength, which constitutes the supremacy of the cermets according to the invention as against familar cermets.

In the present invention, moreover, a method of fabrication of the cermets mentioned above is indicated which is characterized by the fact that ceramic particles, especially spherical ceramic particles, coated with the respective metal component and with a diameter between 20 and 500 μm., preferably between 80 and 150 μm., are vibrated into metallic capsules which exhibit a plastically still sufficient under the conditions of compaction and afterwards are welded airtight, and are compacted to the ultimate density by isostatic hot pressing at pressures ranging from 100 to 1000 kg./cm.$^2$ and temperatures between 1000 and 1700° C. The desired uniform distribution and the non-porous compaction of the metallic phase is achieved preferably by "isostatic hot pressing."

For instance, a pressure exerted one-dimensionally, as in the case of die pressing, produces a lenticular deformation of the originally spherical particles and thus a direction dependence of the physical properties of the cermet body which has a very negative influence, especially on the strength properties.

A range of temperature preferably employed in isostatic hot pressing is the range between 1200 and 1600° C. However, this always depends on the melting point of the metals used as the metallic phase and as the capsule material, respectively. For instance, in the fabrication of $UO_2/Mo$, $UO_2/Cr$, and $Al_2O_3/Cr$ cermets in accordance with the method according to the invention, the best results were obtained in this range of temperature. As the metallic capsules into which the metal coated ceramic particles are vibrated it is possible, for temperatures below 1200° C., to use capsules of iron or stainless chrome-nickel steels, for temperatures above 1200° C. capsules of tantalum, niobium, molybdenum, or vanadium. These materials also exhibit the necessary plasticity when the pressure is exerted. It is important that the pressure be exerted only from the outside, hence, the capsules must be welded absolutely tight. Welding the capsules also avoids evaporation losses of the metallic phase under compression conditions so that the proportion of metallic phase provided the ceramic particles in the process of coating is reflected in the cermet in the metal matrix.

In accordance with the invention the process is executed favorably by inserting one or more filled and welded capsules into a vertical high-pressure high-temperature autoclave with internal heating, the free volume around the capsule(s) being filled with coarse high-temperature resistant ceramic powder of a high bulk density, e.g. $Al_2O_3$ powder, the autoclave is then evacuated and helium gas is introduced as a pressure and heat transfer agent. Evacuation of the autoclave is intended mainly to reduce the $H_2O$ and $O_2$ content to avoid oxidation of the capsule in this way. In accordance with the invention, the pressure and heat transfer agent is initially compressed to an initial pressure around 150 to 300 kg./cm.$^2$, then heated to a temperature some 15 to 20% above the recrystallization temperature of the powder to be compressed by gradual heating of the capsules inside the autoclave furnace, and then pressure and temperature are increased to the final values which are maintained for a period of 2 to 5 hours.

The ultimate pressure required can be reached either through the temperature of the autoclave furnace or by additional pumping by means of the compressor. After a holding time of 2 to 5 hours, preferably 4 hours, pressure and temperature are continuously reduced to their normal values.

For the process of isostatic hot pressing the ductility of the cladding material and the pressure sintering behavior of the powder to be compacted must be taken into account when fixing the pressure-temperature cycle. A point of reference for the cladding materials, e.g., may be the hot yield point, for ceramic powders the behavior under normal hot pressing.

Such cermets as described in the invention and consisting of actinide ceramics, especiallly as spherical, possibly monodisperse particles, in connection with molybdenum, chromium, austenitic chrome-nickel steels or vanadium as the metallic phase or stainless chrome-nickel steel and vanadium-base alloys for the capsule and, at the same time, cladding materials can be used under the invention as clad nuclear fuel and/or blanket elements.

According to another characteristic of the invention, the cermets according to the invention as described above are used as high-temperature materials, for instance as construction materials for gas turbine blades or as crucible materials.

Figure 2:
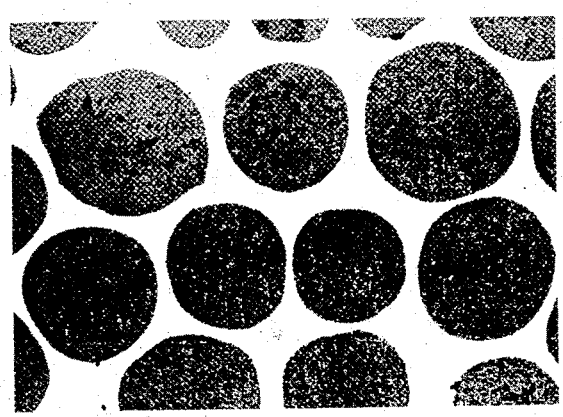
Figure 3:
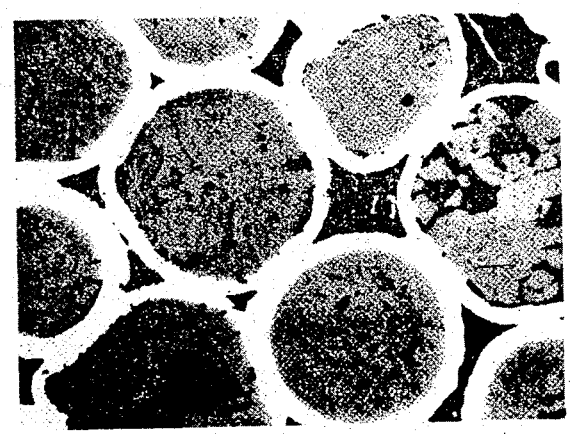

Below, the invention will be explained in detail by examples and drawings, the indications of materials and figures mentioned herein not being intended as limitations. Briefly, FIGS. 1 to 3 are photomicrographs of sections of cermets made according to the invention, while FIGS. 4 to 8 are graphs of properties of cermets made according to the invention.

For better possibilities of comparison, one cermet is described in each example in which the ceramic component is $UO_2$, the metal component molybdenum.

EXAMPLE 1

Fabrication of a $UO_2$/Mo cermet with a metal content of 12 vol. percent Mo and a density of the metal component of 99% of the theoretical density.

The initial material used were spherical molybdenum-coated $UO_2$ particles with a diameter ranging between 100 and 130 μm. the molybdenum coating of which was made by a process of vapor deposition known from the literature. The metal quantity deposited by evaporation was fixed at 12 vol. percent in this example and checked analytically. These spherical particles were filled into cylindrical capsules of tantalum with a diameter of 9 mm., a length of 50 mm., and a wall thickness of 0.2 mm. and vibrated so that a bulk density of 60% of the theoretical density of the $UO_2$-Mo mixture was achieved. After filling, the capsules were closed with a plug, also of tantalum, and welded absolutely tight by the electron beam process in the high vacuum. These capsules filled with the metallized ceramic particles and welded tight were inserted into an electrically heatable furnace vertically standing in a high-pressure autoclave. The remaining clearance between the capsules and the ceramic furnace pipe was filled with an $Al_2O_3$ powder of a grain size of about 150 μm. Then the autoclave was closed and swept with helium gas. Afterwards, the autoclave was filled with helium gas of about 50 atm. and the furnace temperature was slowly raised with temperature increments of about 150° C. per hour. When a temperature of about 1200° C. had been reached in the specimens, a helium gas compressor was added and the pressure was raised to 850 atm. In this case, pressure and temperature were increased in such a way that when an inside pressure of 850 atm. was reached, an ultimate specimen temperature of 1650° C. was attained simultaneously.

Pressure and temperature were maintained at their maximum values for about four hours, then the furnace was cooled down at about 200° C. per hour. After reaching room temperature, the helium pressure in the autoclave was still some 500 atm., which was gradually reduced to 1 atm. FIG. 1 shows a microsection of a $UO_2$/12 vol. percent Mo cermet made by this process. In the microstructure a continuous uniform metal matrix of constant thickness can be seen in which the ceramic particles, flattened at their outer boundaries as a result of the high pressure, are imbedded.

EXAMPLE 2

Fabrication of a $UO_2$/Mo cermet with a metal content of 40 vol. percent Mo and a density of the metal component of 100% of the theoretical density.

The initial material used in this case were spherical molybdenum coated $UO_2$ particles of sizes between 100 and 130 μm., the metal quantity deposited by evaporation being 40 vol. percent. As in Example 1, the particles were vibrated into cylindrical tantalum capsules so that the bulk density was about 60% of the theoretical density. The filled metal capsules then were closed with a plug made of the same material and sealed airtight in the high vacuum. Then the capsules were inserted into the furnace in the same way as in Example 1 and were isostatically hot pressed under the same conditions of temperature and pressure. After a holding time of four hours at the maximum values of 850 atm. and 1650° C. the furnace was cooled again uniformly by about 200° C. per hour. When room temperature had been reached, the autoclave still had a pressure of about 500 atm. which was slowly reduced to atmospheric.

The microstructure of the cermets obtained under these conditions is shown in FIG. 2. This indicates that the ceramic spheres are uniformly distributed in the metal matrix the fraction of which in the cermet is 40 vol. percent. Remarkably enough, the spherical shape remains intact at the high metal fractions. The metal component in the cermet was compacted to 100% of the theoretical density.

EXAMPLE 3

Fabrication of $UO_2$/Mo cermet with a metal content of 30 vol. percent Mo and a density of the metal component of about 85% of the theoretical density.

The initial material used consisted of spherical, molybdenum coated $UO_2$ particles of sizes between 100 and 130 μm. with the quantity of metal deposited by evaporation being 30 vol. percent Mo. These particles were vibrated into cylindrical tantalum capsules as in the Examples 1 and 2, so that the bulk density of about 60% of the theoretical density was attained. After airtight welding of the capsules these again were inserted into the furnace standing in the high-pressure autoclave, and the surrounding free space was filled with $Al_2O_3$ powder of about 150 μm. grain size. Then the autoclave was closed, swept for some time and afterwards filled with helium gas of about 50 atm. Now, the furnace temperature was raised to 1000° C. at a rate of about 150° C. per hour. When this temperature had been reached, an additional helium gas compressor was connected, which increased the pressure to 700 atm. In this case, pressure and temperature were increased in parallel in such a way that an ultimate specimen temperature of 1250° C. was reached at the same time when an internal pressure of 700 atm. had been attained. Now, pressure and temperature were maintained at these maximum values for four hours. Afterwards, the furnace was cooled at a rate of temperature decrease of some 200° C. When room temperature was reached, the helium pressure in the autoclave, which was still some 350 atm., was slowly reduced to 1 atm.

The microstructure obtained under these conditions is shown in FIG. 3. Again, it is clear that due to the relatively high fraction of the metal component there is almost no deformation of the ceramic spheres. At a compaction of 85% of theoretical density, the metal component still exhibits cavities.

Figure 4:
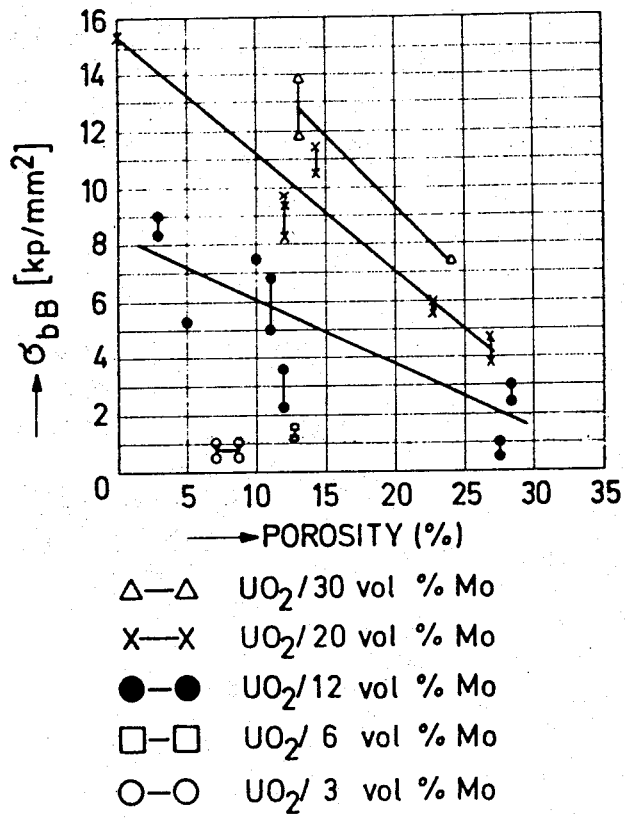

FIG. 4 shows a diagram representing the bending strength of the cermets according to the invention for the $UO_2$/Mo system as a function of porosity; the Mo concentration was selected as a parameter. The porosity was determined by weighing in air and in carbon tetrachloride, respectively. The test specimens used were rectangular samples. The measurements were carried out at room temperature. For the measurements, a four-point support and a rate of loading of 1 mm./min. were employed.

As was expected, the bending strength strongly decreases with increasing porosity. The curve can be assumed to be linear. Moreover, it can be seen that the influence of porosity on the bending strength obviously increases with rising metal concentration.

Figure 5:
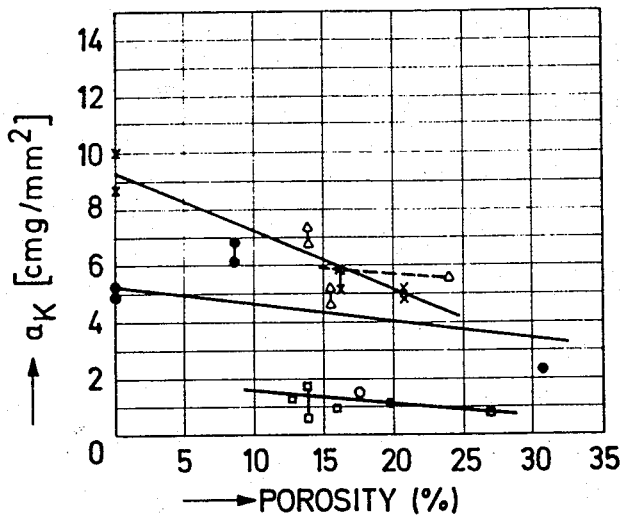

FIG. 5 shows the curve of impact toughness as a function of porosity and molybdenum concentration at room temperature for the $UO_2$/Mo system. In principle, the same behavior is observed as in the case of bending strength in FIG. 4. The impact toughness increases at equal metal content with decreasing porosity, whereas it increases at constant porosity with increasing metal content.

The impact toughness was measured by the so-called drop test as described in the Journal of the American Ceramic Society, vol. 39, No. 8 (1956) pp. 261 ff. and in Wiss. Zeitschr. TH Dresden 6, 1956/57, H. 2 and 1959, H. 8, pp. 401–409. The installation for the measurement in principle consists of a free two-point support of the specimen and a weight which destroys the test specimen in a fall under gravity. The product of weight and drop height results in the impact work which is related to the test cross section.

Moreover the electric resistivity at room temperature and the thermal conductivity at 100° C. were determined as a function of metal concentration. The electric resistivity was measured by means of a Thomson bridge. The square specimen was chucked at its ground front faces in a specially manufactured adapter. This is where the electric current was fed in. The voltage decrease was measured by means of copper edges. The thermal conductivity was measured in square plates of about 7 x 7 mm.$^2$ and in rectangles of about 7 x 12 mm.$^2$ cross section and a height of about 4.5 mm. The principle of the method of measurement is based on the measurement of the distillation period of a specific quantity of liquid which was caused to evaporate by the heat quantity flowing into the specimen. In this way, a measurement of the temperature is avoided.

Figure 6:
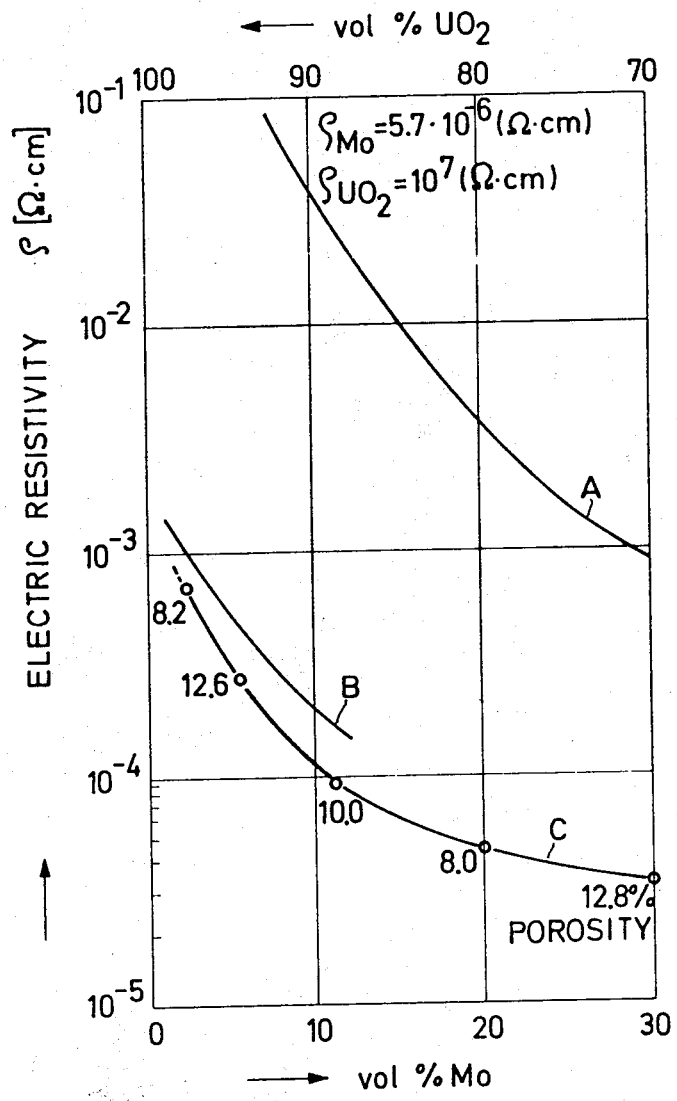

FIG. 6 is a plot of results of measurements of the resistivity of the cermets according to the invention as a function of the metal concentration (curve C). For comparison, the values of the electric resistivity for $UO_2$/Mo sintered bodies (curve A) made on the basis of a $UO_2$ and Mo powder mixture baked into a cermet according to the familiar sintering process, for axially hot pressed $UO_2$ particles, also with a coating of molybdenum (curve B). It is seen that the transition from the sintered cermet (curve A) to the axially hot pressed structure (curve B) results in an improvement in the electric resistivity of about two powers of ten. This is due to the fact that the structures of the sintered $UO_2$/Mo sample do not contain a continuous metal matrix. The transition from axial (curve B) to isostatic hot pressing (curve C) again indicates an improvement in the electric resistivity by a factor of 2–4. The decrease in resistivity from pure $UO_2$ to $UO_2$—3 vol. percent Mo is already extremely strong.

Since good thermal conductivity is of extreme importance for the use of the cermets according to the invention as nuclear fuel elements, this property was closely investigated for the cermets under the invention. In FIG. 7, the measured thermal conductivity of $UO_2$/Mo cermets with molybdenum contents between 3 and 40 vol. percent has been plotted (curve A).

The measured points indicated in the diagram show an average of five individual measurements each. The measuring accuracy was 10%. For Comparison, the values for measured thermal conductivities of $UO_2$/Mo sintered bodies at 40° C. have been plotted (curve B). The figures near the individual measured points indicate the respective density of the specimen.

With the exception of the different temperatures of measurement and porosities of the specimens, the curves cannot be directly compared because the conductivity values of pure $UO_2$ were found to be different and were inserted in FIG. 7 in this way. However, the steep rise in the values in curve A up to 12 and vol. percent Mo, respectively, as against the much flatter rise in curve 1 is obvious. This can be explained by the good thermal conductivity of the fully established molybdenum matrix. The situation is apparent even more clearly from FIG. 8, where the data are indicated as conductivity referred to $UO_2$. For comparison, the data of $UO_2$/Mo sintered bodies (curves B, C by two different authors) were included.

In the representation, a correction was made for the porosity, because the thermal conductivity is known to react sensitively to any pores existing. For the correction formulas, those by Rayleigh and Maxwell:

$$\lambda_{100} = \frac{(2+Vp)}{2(1-Vp)} \cdot \lambda \qquad (I)$$

and that by MacEwan et al.:

$$\lambda_{100} = \lambda \cdot (1-\alpha p) \qquad (II)$$

were considered. The symbols have these meanings: $p$, $Vp$ = pore volume, $\alpha = f(Vp)$ correction factor, $\lambda_{100}$ = thermal conductivity at 100% density.

The values corrected according to Formula I are indicated in FIG. 8. From the way of representation in FIG. 8 the structural difference between cermet structures of coated particles and those of powder mixtures is much more evident. For the straight lines it is possible in a crude approximation to give the following interpolation formulas for thermal conductivity:

(a) Cermets of powder mixtures: $\lambda_1 = \lambda UO_2 + (4 \div 5) \cdot x$
(b) Cermets of coated particles: $\lambda_2 = \lambda UO_2 + 13 \cdot x$ where $x$ = molybdenum content (for pure Mo, $x=1$) in volume fractions.

What is claimed is:

1. Method for fabricating cermets of high static and dynamic strength, having a metal content of 10 to 50 volume percent), said metal content extending uniformly in all three dimensions, the density of the metal component in the cermets being in the range between 95 and 100% of the theoretical density, the density of the ceramic component being in the range between 85 and 100% of the theoretical density, comprising the steps of vibrating metal-coated ceramic particles having a particle size range between 20 and 500 μm. in metallic capsules, welding said capsules airtight, and compacting the particles to ultimate density by isostatic pressing at pressures between 100 and 1000 kg./cm.$^2$ and temperatures between 1000 and 1700° C., said capsules having still sufficient plasticity under the conditions of the step of compacting.

2. Method as claimed in claim 1, wherein the isostatic hot pressing is conducted in the range of temperatures between 1200 and 1600° C. and in the range of pressures between 600 and 1000 kg./cm.$^2$.

3. Method as claimed in claim 1, wherein the material of said capsules is selected from the group consisting of iron and Cr-Ni steels for temperatures below 1200° C. and from the group consisting of tantalum, niobium, molybdenum, and vanadium for temperatures above 1200° C.

4. Method as claimed in claim 3, where at least one filled and airtight welded capsule is inserted into a vertical high-pressure high-temperature autoclave with internal heating, the free volume around the capsule being filled with coarse high-temperature resistant ceramic powder of a high bulk density, the autoclave afterwards being evacuated and a pressure and heat transfer medium being introduced.

5. Method as claimed in claim 4, where the pressure and heat transfer medium is compressed to an initial pressure of about 150 to 300 kg./cm.$^2$ and then by gradual heating of the capsule introduced into autoclave furnace to a temperature about 15–25% above the recrystallization temperature of said particles, with a subsequent increase to the ultimate values of pressure and temperature which are maintained for a period of about 2 to 5 hours.

6. Method as claimed in claim 1, said particles having a particle size range between 80 and 150 μm.

7. Method as claimed in claim 1, wherein the cermets have a metal content of 20 to 40 volume percent.

8. Method as claimed in claim 1, wherein the density of the metal component in the cermets is between 99 and 100% of the theoretical density.

9. Method as claimed in claim 1, wherein the metal content is chosen for providing in the cermets an intermediate metallic layer between adjacent ceramic particles.

10. Method as claim in claim 1, wherein the ceramic portion of said particles is substantially spherical in shape.

11. Method as claimed in claim 5, wherein said capsules are tantalum having a wall thickness of about 0.2 mm., said particles are spherical molybdenum-coated $UO_2$ with a diameter ranging between 100 and 130 $\mu$m., the molybdenum quantity is about 12 volume percent, the step of vibrating achieves a bulk density of about 60% of theoretical density, the ceramic powder of high bulk density is $Al_2O_3$ powder having a grain size of about 150 $\mu$m., the initial pressure of the pressure and heat transfer medium is about 50 atm., the gradual heating to a temperature about 15–25% above the recrystallization temperature is at a rate of about 150° C. per hour to a temperature of about 1200° C., and the subsequent increase to the ultimate values of pressure and temperature is to about 850 atm. and about 1650° C., and further comprising the steps of maintaining the ultimate values for about four hours, then cooling at a rate of about 200° C. per hour to room temperature, and then gradually reducing pressure to 1 atm., whereby a $UO_2$/mo cermet with a metal content of 12 volume percent Mo and a density of the metal component of 99% of the theoretical density is achieved.

12. Method as claimed in claim 5, wherein said capsules are tantalum having a wall thickness of about 0.2 mm., said particles are spherical molybdenum-coated $UO_2$ with a diameter ranging between 100 and 130 $\mu$m., the molybdenum quantity is about 40 volume percent, the step of vibrating achieves a bulk density of about 60% of theoretical density, the ceramic powder of high bulk density is $Al_2O_3$ powder having a grain size of about 150 $\mu$m., the initial pressure of the pressure and heat transfer medium is about 50 atm., the gradual heating to a temperature about 15–25% above the recrystallization temperature is at a rate of about 150° C. per hour to a temperature of about 1200° C., and the subsequent increase to the ultimate values of pressure and temperature is to about 850 atm. and about 1650° C., and further comprising the steps of maintaining the ultimate values for about four hours, then cooling at a rate of about 200° C. per hour to room temperature, and then gradually reducing pressure to 1 atm., whereby a $UO_2$/Mo cermet with a metal content of 40 volume precent Mo and a density of the metal component of 100% of the theoretical density is achieved.

References Cited

UNITED STATES PATENTS

| | | | |
|---|---|---|---|
| 3,318,695 | 5/1967 | Goslee et al. | 75—212 |
| 3,346,676 | 10/1967 | Hirose et al. | 264—.5 |
| 3,340,056 | 9/1967 | Cloran et al. | 264—.5 UX |
| 3,340,053 | 9/1967 | Hodge et al. | 75—226 |
| 3,276,867 | 10/1966 | Brite et al. | 75—226 |
| 2,725,288 | 11/1955 | Dodds et al. | 75—226 |

CARL D. QUARFORTH, Primary Examiner

B. H. HUNT, Assistant Examiner

U.S. Cl. X.R.

75—212, 214, 226; 252—301.1 R; 264—0.5